(No Model.)
R. H. LAIRD.
APPARATUS FOR MAKING AND PURIFYING GAS.
No. 532,075. Patented Jan. 8, 1895.
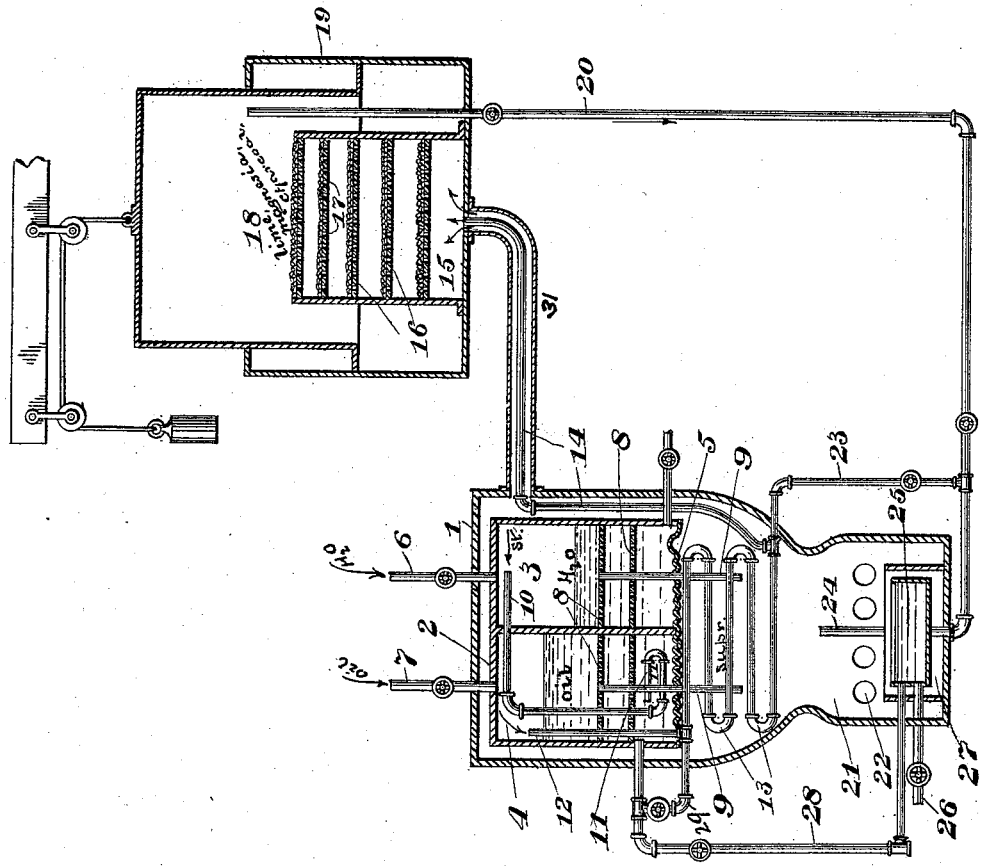
WITNESSES:
W. S. Boyd,
Ahau Macauley.
INVENTOR:
Robert H. Laird,
By J. B. Caplinger
Attorney.

UNITED STATES PATENT OFFICE.

ROBERT H. LAIRD, OF TORONTO, CANADA, ASSIGNOR TO WILLIAM HENRY LAIRD, OF NEW YORK, N. Y.

APPARATUS FOR MAKING AND PURIFYING GAS.

SPECIFICATION forming part of Letters Patent No. 532,075, dated January 8, 1895.

Application filed March 15, 1893. Serial No. 466,024. (No model.)

*To all whom it may concern:*

Be it known that I, ROBERT H. LAIRD, of the city of Toronto, in the county of York, Province of Ontario, Canada, have invented certain new and useful Improvements in Apparatus for Making and Purifying Gas; and I hereby declare the following is sufficiently full, clear, and exact to enable others skilled in the art to which it appertains to make, use, and operate the same.

This invention relates to certain improvements in apparatus for manufacturing gas and has for its object to provide a simple and inexpensive apparatus of this character which shall be of novel construction and shall present certain advantages over other apparatus heretofore employed for the purpose, all as will be hereinafter fully set forth.

The novel features of my invention will be carefully defined in the claims.

In order that my improvements may be the better understood I have shown in the accompanying drawing a vertical section of an apparatus constructed according to my invention, in which drawing—

1 represents a casing, in the upper portion of which is formed a vaporizer 2, having a bottom 5 of corrugated metal, and divided by a vertical partition into two compartments or chambers 3, and 4, of substantially equal dimensions, which chambers or compartments are provided respectively, with water and oil inlet pipes 6 and 7 for the admission of water and oil to the vaporizer. These chambers 3 and 4 are each provided with a series of perforated partitions 8, 8, arranged below the liquid level to which partitions are connected the upper ends of heat conducting pins 9, extending vertically downward through the bottoms of the chambers, which I will hereinafter call respectively the "boiler" and oil chamber of the vaporizer, the object of this construction being to secure as great a heating surface as may be possible, for a further increase of which the corrugated bottom 5 is employed.

Arranged in the upper steam space of the water chamber or boiler 3 is a steam pipe 10, leading through the vertical partition of the vaporizer into the oil chamber 4, where it is bent vertically downward, passing through the perforated partitions or diaphragms 8 and being provided at its lower end with a spray nozzle 11, of suitable form.

The oil chamber is provided with an outlet pipe 12, projecting through its bottom and connecting with a superheating coil 13, arranged in the lower part of the casing 1, which coil is in communication through a pipe 14 with a filter 15, arranged at the inlet to a gas holder 18. This filter comprises a series of trays 16 having perforations 17, on which trays are arranged layers of powdered lime, magnesia and charcoal.

In the lower portion of the casing 1 is formed a combustion chamber 21, having air inlets 22 for the supply of air to a burner 24 supplied with gas by the gas pipe 20, leading through the water tank 19 of the gas holder 18, and in order to dispose of the residuum or heavy tar remaining in the oil chamber 4 after the vaporization of the lighter hydrocarbons I have provided in the base of the combustion chamber 21 a tank 25, having a pipe 28 connecting with the base of said oil chamber 4, whereby the residue therefrom may be fed to the tank to be burned. In burning said residue, I prefer to partially fill the tank 25 with water and to supply the oil thereto in a thin stratum, whereby danger is avoided. In some cases it is desirable to subject this residue to a supplemental heating in order to insure the removal therefrom of all of the lighter hydrocarbons, and for this purpose I have provided the coupling 29 between the pipe 28 and the coil 13. In this manner small quantities of the residue from the oil chamber 4 may be admitted to the coil 13 and submitted to a higher degree of heat than is possible in the oil chamber, whereby all of the lighter hydrocarbons are disengaged.

As shown in the drawing the vaporizer 2 is of a smaller cross section than the upper portion of the casing 1, whereby a space 30 is left between the vaporizer and the internal walls of the casing whereby the heated products of combustion from the combustion chamber have free access to all of the walls of the vaporizer, and in order to prevent the deposit of soot, &c., as well as the stench attendant upon the vaporization of crude oil I have provided the flue 31, leading from the upper portion of the casing 1 to the filter, which flue surrounds the vapor pipe 14, and serves as a jacket to prevent condensation of the vapors therein or their cooling. On arriving at the filter, the heated products of combustion pass therethrough depositing all soot, ammonia and carbonic acid, and unite with the hydrocarbon vapors passing through the vapor pipe 14, to produce a fixed gas, as will be readily understood.

Having thus described my invention, I claim—

1. In an apparatus for the manufacture of gas, the combination with a casing provided with an air inlet and an outlet for the products of combustion, of a burner arranged in said casing, a vaporizer arranged in said casing over said burner said vaporizer having a partition dividing its interior into a boiler and an oil chamber, perforated diaphragms arranged in said oil chamber and boiler below the liquid levels, heat conducting pins connected at their upper ends to said partitions and having their lower ends extending through the bottom of the vaporizer over the said burner, inlet pipes for said boiler and oil chamber, a steam pipe extending from said boiler through the said partition and being provided with a spray nozzle arranged below the liquid level of the oil chamber and an outlet tube for the vapors from said oil chamber, substantially as set forth.

2. In an apparatus for the manufacture of gas, the combination with a casing provided with an air inlet and an outlet for the products of combustion, of a burner arranged in said casing, a vaporizer arranged in said casing over said burner, and having a partition dividing its interior into a boiler and an oil chamber, each of which is provided with an inlet, a steam pipe extending from said boiler through said partition and being provided with a spray nozzle arranged below the liquid level in the oil chamber, an outlet tube for the vapors from said oil chamber, a filter with which said outlet tube communicates, and a flue connecting between the outlet of the casing and the said filter, said flue surrounding the outlet tube from the oil chamber, substantially as set forth.

3. In an apparatus for the manufacture of gas, the combination with a casing having an air inlet and an outlet for the products of combustion, of a vaporizer arranged in said casing and also provided with an oil inlet and with outlets for the vapors and for the residuum, an oil burner arranged in said casing below said vaporizer, a supply pipe connecting said burner with the residuum outlet of the vaporizer, a superheating pipe connecting with both the vapor and residuum outlets of the vaporizer and having a portion of its length arranged over the burner and adapted to be heated therefrom, a valve arranged in said superheating pipe and adapted to govern the supply of residuum thereto, and a filter connecting with said superheating pipe, substantially as set forth.

Toronto, February 20, 1893.

ROBERT H. LAIRD.

In presence of—
C. H. RICHES,
A. TODD.